United States Patent
Alderfer et al.

(10) Patent No.: US 10,419,940 B2
(45) Date of Patent: Sep. 17, 2019

(54) SYSTEMS AND METHODS OF ADAPTIVE MITIGATION FOR SHARED ACCESS

(71) Applicant: CABLE TELEVISION LABORATORIES, INC, Louisville, CO (US)

(72) Inventors: Robert Alderfer, Louisville, CO (US); Bernard McKibben, Broomfield, CO (US); Gregory Rutz, Arvada, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 15/387,299

(22) Filed: Dec. 21, 2016

(65) Prior Publication Data

US 2017/0180999 A1   Jun. 22, 2017

Related U.S. Application Data

(60) Provisional application No. 62/270,427, filed on Dec. 21, 2015, provisional application No. 62/302,912, filed on Mar. 3, 2016.

(51) Int. Cl.
| | |
|---|---|
| *H04W 16/14* | (2009.01) |
| *H04W 52/24* | (2009.01) |
| *H04W 74/08* | (2009.01) |
| *H04W 4/80* | (2018.01) |

(52) U.S. Cl.
CPC .............. *H04W 16/14* (2013.01); *H04W 4/80* (2018.02); *H04W 52/241* (2013.01); *H04W 52/243* (2013.01); *H04W 74/0816* (2013.01)

(58) Field of Classification Search
None
See application file for complete search history.

(56) References Cited

U.S. PATENT DOCUMENTS

| | | | | |
|---|---|---|---|---|
| 8,862,346 | B2 * | 10/2014 | Saltsman ............ | G01M 17/007 |
| | | | | 701/51 |
| 9,049,708 | B2 * | 6/2015 | Freda .................. | H04W 72/005 |
| 9,184,886 | B2 * | 11/2015 | Bontu .................... | H04L 5/001 |
| 9,258,833 | B2 * | 2/2016 | Bitran .................. | H04W 76/10 |
| 9,439,197 | B1 * | 9/2016 | Ngo .................. | H04W 72/0453 |
| 9,537,642 | B2 * | 1/2017 | Belghoul ............ | H04W 28/085 |
| 9,603,110 | B2 * | 3/2017 | Chakraborty ......... | H04W 88/06 |
| 9,622,089 | B1 * | 4/2017 | Ngo ..................... | H04W 16/14 |
| 9,699,786 | B2 * | 7/2017 | Ngo ..................... | H04W 16/14 |
| 9,753,749 | B2 * | 9/2017 | Gatson ................ | G06F 9/44505 |

(Continued)

OTHER PUBLICATIONS

U.S. Appl. No. 62/236,311, filed Oct. 2, 2015, Nama, "LTE-U with Best Effort LBT".*

*Primary Examiner* — Gregory B Sefcheck
(74) *Attorney, Agent, or Firm* — Armstrong Teasdale LLP

(57) ABSTRACT

A method for managing shared wireless communications in a wireless communication network is provided. The wireless communications network includes at least one cooperative device and at least one non-cooperative device. The method includes the steps of monitoring, by the at least one cooperative device, a selected channel of a shared spectrum of the wireless communication network, detecting, by the at least one cooperative device, a presence of a transmission from the non-cooperative device within a measurable vicinity of the cooperative device, and responding, by the at least one cooperative device, to the detected presence of the transmission from the non-cooperative device.

20 Claims, 4 Drawing Sheets

(56) References Cited

U.S. PATENT DOCUMENTS

| | | | | |
|---|---|---|---|---|
| 9,807,619 | B2* | 10/2017 | Tsai | H04W 16/14 |
| 9,839,038 | B2* | 12/2017 | Lin | H04W 72/0453 |
| 9,853,797 | B2* | 12/2017 | Tabet | H04L 27/0006 |
| 9,924,518 | B2* | 3/2018 | Yi | H04W 72/0453 |
| 10,148,369 | B2* | 12/2018 | Ng | H04L 5/005 |
| 10,153,891 | B2* | 12/2018 | Freda | H04W 72/005 |
| 10,225,863 | B2* | 3/2019 | Andreoli-Fang | H04W 16/14 |
| 2010/0106852 | A1* | 4/2010 | Kindig | G06F 16/437 709/231 |
| 2013/0272260 | A1* | 10/2013 | Bitran | H04W 76/10 370/329 |
| 2015/0222410 | A1* | 8/2015 | Belghoul | H04W 28/085 370/252 |
| 2015/0223077 | A1* | 8/2015 | Fan | H04W 16/14 370/312 |
| 2015/0223243 | A1* | 8/2015 | Tabet | H04W 28/085 370/330 |
| 2015/0319701 | A1* | 11/2015 | Ng | H04L 5/005 370/311 |
| 2016/0066322 | A1* | 3/2016 | Bontu | H04L 5/001 370/329 |
| 2016/0119971 | A1* | 4/2016 | Bachu | H04W 16/14 370/328 |
| 2016/0142192 | A1* | 5/2016 | Damnjanovic | H04W 74/0816 370/329 |
| 2016/0163130 | A1* | 6/2016 | Zagajac | G07C 5/0808 701/29.1 |
| 2016/0345260 | A1* | 11/2016 | Johnson | H04W 52/0209 |
| 2017/0086076 | A1* | 3/2017 | Sadek | H04W 16/14 |
| 2017/0099666 | A1* | 4/2017 | Nama | H04W 72/0453 |
| 2017/0272955 | A1* | 9/2017 | Sadek | H04L 1/0001 |
| 2018/0124807 | A1* | 5/2018 | Smith | H04W 16/14 |
| 2018/0288804 | A1* | 10/2018 | Cheng | H04W 16/14 |

* cited by examiner

SYSTEMS AND METHODS OF ADAPTIVE MITIGATION FOR SHARED ACCESS

CROSS REFERENCE TO RELATED APPLICATIONS

This application claims the benefit of and priority to U.S. Provisional Patent Application Ser. No. 62/270,427, filed Dec. 21, 2015, and to U.S. Provisional Patent Application Ser. No. 62/302,912, filed Mar. 3, 2016, both of which are incorporated herein by reference in their entirety.

BACKGROUND

The field of the disclosure relates generally to management of shared wireless communications, and more particularly, to wireless communication management utilizing adaptive mitigation.

Conventional wireless communication systems utilize a shared spectrum. For example, the 2.4 GHz and 5 GHz frequency bands are used for Wi-Fi, Bluetooth, Zigbee, and a range of other consumer, industrial, and medical wireless technologies. Other technology platforms also share a spectrum in other frequency ranges, and available wireless spectra will become more intensively shared as demand for wireless technologies increases.

Some conventional shared spectrum technology systems utilize algorithm- and sensing-based distributed access, which enable common use of a wireless resource, despite a lack of active coordination among users. For example, typical Wi-Fi systems employ a carrier sense multiple access with collision avoidance (CSMA/CA) network multiple access method, which is also known as "listen-before-talk" (LBT), in which carrier sensing is used, but nodes attempt to avoid collisions by transmitting only when the channel is sensed to be idle (not being used). Wi-Fi devices employ a common, standards-based protocol to avoid interference among themselves and other users, which provides a substantially equal probability of access across all users in channel conditions.

However, new technologies are being introduced into the shared spectrum, which do not employ the cooperative techniques used by Wi-Fi devices. In particular, the introduction of mobile technologies utilizing Long Term Evolution (LTE) are known to interfere with existing technologies like Wi-Fi, due to the centralized architecture of LTE and mobile systems where spectrum access is scheduled by the network, instead of being distributed by a common protocol of the device accessing the network. Mobile technologies utilizing LTE are able to thus dominate access to a shared spectrum without regard to cooperative technologies. These non-cooperative mobile technologies can be implemented in an aggressive manner that utilizes a disproportionate share of airtime, as compared with cooperative technologies. For example, when a scheduled technology, such as LTE, competes with a technology that employs distributed coordination techniques, such as Wi-Fi, the Wi-Fi system will inherently defer to (that is, fail to transmit) the scheduled technology. In other words, the Wi-Fi system (and similar cooperative technologies) will "hear" the LTE system (or non-cooperative technologies) "talking," and will wait their turn to access and transmit to the network. Wi-Fi and other cooperative/distributed technologies are thus at an inherent disadvantage in the shared spectrum, and will experience significant interference and degraded performance when forced to compete with non-cooperative technologies.

BRIEF SUMMARY

In an embodiment, a method for managing shared wireless communications in a wireless communication network is provided. The wireless communications network includes at least one cooperative device and at least one non-cooperative device. The method includes the steps of monitoring, by the at least one cooperative device, a selected channel of a shared spectrum of the wireless communication network, detecting, by the at least one cooperative device, a presence of a transmission from the non-cooperative device within a measurable vicinity of the cooperative device, and responding, by the at least one cooperative device, to the detected presence of the transmission from the non-cooperative device.

In an embodiment, a wireless communications system includes at least one cooperative electronic device having a processor and a transceiver, at least one non-cooperative electronic device, an access point configured to wirelessly send and receive polite transmission data to and from the at least one cooperative electronic device, respectively, and a communications node configured to wirelessly send and receive aggressive transmission data to and from the at least one non-cooperative electronic device, respectively. The transceiver is configured to monitor a selected channel of a shared spectrum of the wireless communications system and identify the presence of the aggressive transmission data within a proximity of the at least one cooperative electronic device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
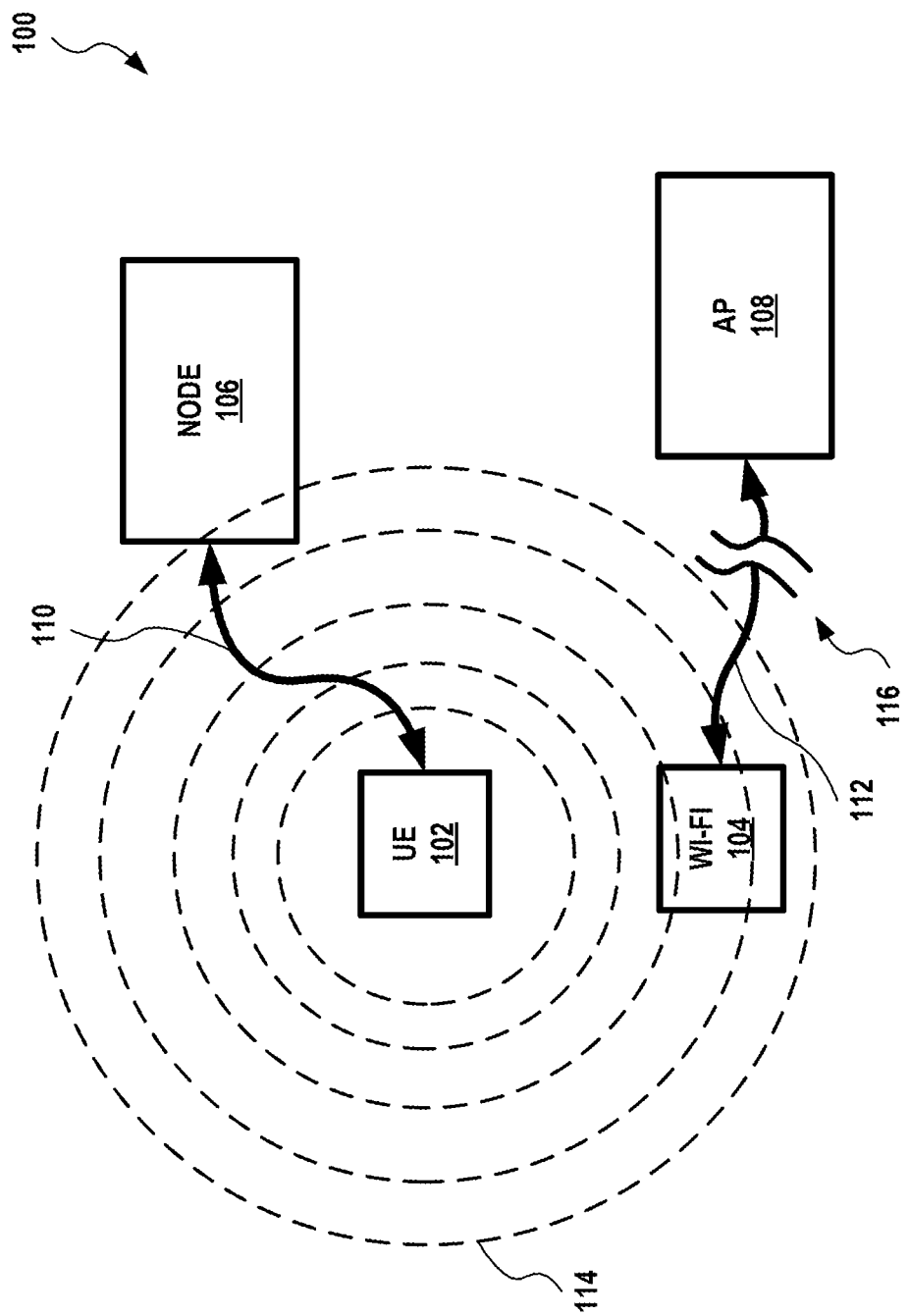
FIG. 1 is a schematic illustration of a shared spectrum system, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments herein describe and illustrate a transceiver and methods for adaptive management of shared wireless communications, and particularly wireless communications in the unlicensed spectrum, or unlicensed bands (e.g., 2.4 GHz, 3.5 GHz, 5 GHz, etc.). Examples of technologies used in the unlicensed spectrum include Wi-Fi, Bluetooth, Zigbee, with Wi-Fi presently being the dominant technology for unlicensed shared access. Wi-Fi is a cooperative technology that uses CSMA/CA to ensure the efficacy of distributed access across otherwise uncoordinated transceivers. Such cooperative technology includes coexistence features that allow it to first verify (e.g., by LBT), before accessing a channel, that the channel is clear prior to transmission of data. CSMA/CA then allows for the distribution of access control to all cooperative users (i.e., user devices) on that channel.

Technologies such as LTE operate in the unlicensed spectrum (e.g., LTE-U) in a non-cooperative manner. LTE-U has been widely deployed, and functions to dominate the unlicensed spectrum through a centralized control of aggressive transmission techniques. The cooperative technologies are colloquially referred to as "polite" technologies, whereas the non-cooperative technologies are colloquially referred to as "aggressive" technologies. LTE-U is considered aggressive, since it schedules and applies traffic to the accessed channel without first assessing if the channel is clear of other network transmissions. LTE-U may sometimes implement separate systems to avoid the LTE-U transmissions, but LTE-U will typically transmit over other technologies without such separate systems.

LTE-U generally operates according to an ON/OFF duty cycle. The embodiments disclosed herein feature systems and methods for alternative access models in a shared spectrum channel when LTE-U is "ON," as compared to when the LTE-U is "OFF." The present transceiver systems and methods are configured to adapt their use of the shared spectrum to enable more robust access in the presence of non-cooperative technologies and interfering signals. These advantageous features thus enable an improved continuing utility of Wi-Fi and other cooperative technologies in an environment of technological convergence on a shared spectrum.

In an exemplary embodiment, existing polite technologies in the unlicensed band are configured to mitigate the transmission from aggressive technologies that are not designed for distributed control of the accessed channel. Such mitigation techniques further configured to operate in their normal manner when in the presence of other polite protocols, but adapt their operation in the presence of aggressive protocols. For simplicity of explanation, many of the following examples are described only with respect to Wi-Fi as the polite protocol and LTE-U as the aggressive protocol. Nevertheless, the systems and methods described herein may also be utilized similarly with respect to other polite and aggressive technologies, respectively.

According to an embodiment, a cooperative technology, such as Wi-Fi, is configured to monitor and/or sense the spectrum for which access is desired, and detect the waveforms (also known as "signatures") of non-cooperative technologies, such as LTE. In this example, when a non-cooperative technology is not detected, the cooperative technology can be configured to remain in its legacy state of distributed access protocols. That is, the cooperative technology will respond to the additional monitoring/detection functions without changing other operations, such as the LBT protocol, for example. However, when a non-cooperative technology is detected, the transceiver utilizing the cooperative technology is configured to utilize a number of functional techniques to adapt and maintain its performance. Such techniques may include, without limitation: (a) "do nothing"; (b) avoidance; (c) scheduling; (d) power adjustment; (e) throughput adjustment; and (f) reliability restoration.

When implementing the "do nothing" technique, the transceiver (or cooperative node) is configured to assess whether the non-cooperative node is deemed to not be of an aggressive nature, and then determine that no performance diminution of the transceiver/cooperative node is necessary or likely for continued operation. When implementing the avoidance technique, the transceiver or cooperative node is configured to assess the availability of other channels, and then switch transmission to an alternative channel in order to avoid the non-cooperative node in the frequency domain. When implementing the scheduling technique, the transceiver or cooperative node is configured to assess the duty cycle (ON/OFF periods) of the non-cooperative signal/node and adapts its own transmission in the time domain using a predictive model. (See FIG. 4, below).

For the power adjustment technique, the transceiver or cooperative node is configured to assess the signal-to-noise ratio of its own cooperative system in the presence of a non-cooperative node, and then adapt its own transmission power in order to improve signal quality (subject to regulatory restrictions on power levels). For the throughput adjustment technique, the transceiver or cooperative node is configured to reduce its own transmission speed in order to maintain reliability. For the reliability restoration technique, the transceiver or cooperative node is configured to assess transmission errors and airtime collisions and adapt its own data transmission to improve transmission quality.

In the exemplary embodiment, each of the foregoing adaptation techniques may be implemented alone, or in combination with one or more of the other techniques. In some embodiments, the several techniques may be implemented simultaneously, or in succession. In this example, the transceiver/node utilizing the cooperative technology is configured to the channel of the shared spectrum and adapt its medium access cooperative protocol using one or more of the techniques described above in order to maintain its performance in the presence of non-cooperative technologies in the same shared spectrum. These advantageous adaptation techniques are described further below with respect to several drawings.

FIG. 1 is a schematic illustration of an exemplary shared spectrum system 100, according to an embodiment. System 100 includes at least one user equipment (UE) 102, a Wi-Fi device 104, a node 106, and an access point (AP) 110. User equipment 102 may be, for example, a mobile handset, or similar device, that implements an LTE-U transmission protocol to establish an LTE transmission 110 with node 106. In the exemplary embodiment, node 106 may be, for example, an E-UTRAN Node B, also known as Evolved Node B, (abbreviated as eNodeB or eNB) as a hardware element that is communicatively coupled with a mobile phone network (not shown) that communicates wirelessly with user equipment 102. In some embodiments, node 106 may further include a base transceiver station (BTS) for a Global System for Mobile communication (GSM) network. In the exemplary embodiment, Wi-Fi device 104 includes a transceiver or cooperative node (not shown) which establishes a Wi-Fi transmission 112 with access point 110. In an embodiment, the cooperative node of Wi-Fi device 104 includes the transceiver.

In operation, user equipment 102 generates an aggressive transmission signal 114 according to a duty cycle (symbolically represented by dashed lines) within the range of Wi-Fi device 104, which creates an interference 116 in Wi-Fi transmission 112. In the exemplary embodiment, Wi-Fi transmission 112 implements a polite LBT protocol that will typically give way to the detected presence of aggressive transmission signal 114. That is, a cooperative shared spectrum technology, such as Wi-Fi, has the ability to "listen" to the channel of the unlicensed shared spectrum to determine the presence of other users. This listening ability is conventionally employed only for the specific purpose outlined in distributed access protocols for coexistence with other cooperative technologies.

According to the exemplary embodiment, Wi-Fi device 104 is further configured to utilize its existing listening capability to monitor system 100, and then detect and identify the presence of aggressive transmission signal 114. Once aggressive transmission signal 114 is detected/identified, Wi-Fi device 104 is additionally configured to implement one or more of the adaptive behavior techniques described above. In the exemplary embodiment, signatures of non-cooperative technologies, such as LTE, are detected by the transceiver/cooperative node of Wi-Fi device 104 using information gathered through this additional listening process. In some embodiments, this additional listening process may further utilize information relating to the performance of system 100 or Wi-Fi device 104.

In an operative example, the non-cooperative LTE-U technology of user equipment 102 schedules aggressive transmission signal 114 through a duty-cycled ON/OFF mechanism (not shown) of the device. Over a period of time, these duty cycles can be detected by Wi-Fi device 104 and correctly identified as a non-cooperative technology. As described below with respect to FIG. 4, the detected LTE-U waveform is distinct from a typical waveform (see FIG. 3) observed from cooperative technologies. According to a supplemental, or alternative, embodiment, Wi-Fi device 104 is further configured to monitor, detect, and/or identify correlating information pertaining to performance of system 100 or Wi-Fi device 104 itself in order to enhance detection accuracy and aid in further adaptation decisions. Such additional correlating information includes, without limitation: (a) variation in received noise strength patterns over time; (b) increases in latency (delay) of Wi-Fi transmissions, the pattern of which may also vary over time; (c) increases or pattern variations in packet error rates of Wi-Fi transmissions; and (d) decreases or pattern variations of Wi-Fi throughput.

In an exemplary embodiment, the information gathering process utilized by Wi-Fi device 104 can be processed by a processor (not shown) of Wi-Fi device 104, or alternatively at a location of a central server (also not shown). In other embodiments, the gathered information used for detection/identification is aggregated across a number of additional devices or servers (not shown in FIG. 1) in order to provide further analytic and reporting capabilities. In one embodiment, Wi-Fi device 104 is further configured to utilize the gathered information to predict future transmission patterns detected from non-cooperative technologies, due to the scheduled and deterministic nature of such non-cooperative technologies, which are thus more likely to remain stable over meaningful periods of time. In an example, the pattern prediction process utilizes prior patterns of detected non-cooperative protocols in the shared spectrum, and extrapolates detected prior patterns estimate future behavior.

Figure 2:
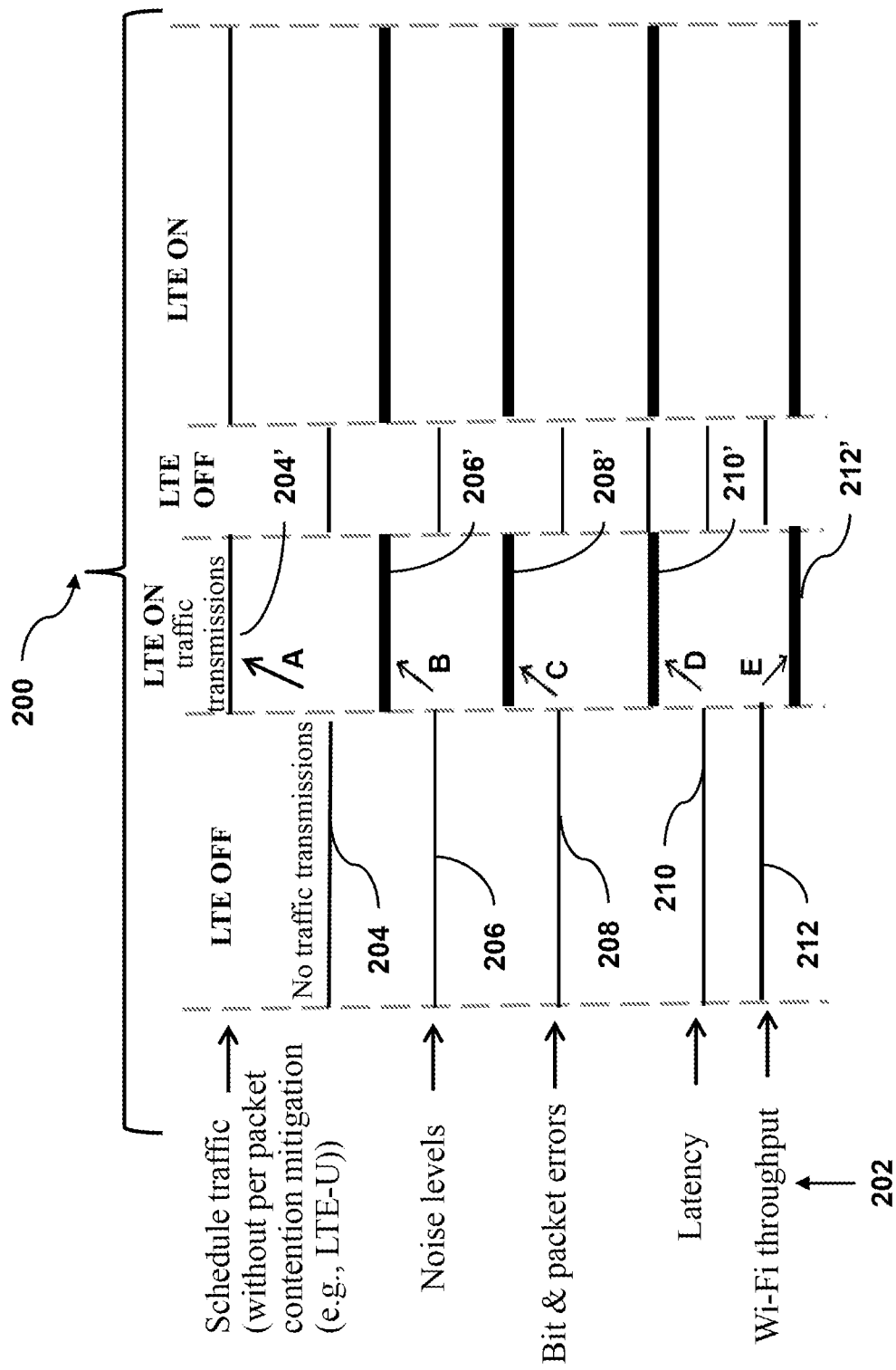
FIG. 2 illustrates an effect of an exemplary duty cycle of a periodic scheduled waveform on transmission parameters for the embodiment depicted in FIG. 1.

FIG. 2 illustrates an effect of an exemplary duty cycle 200 of a periodic scheduled waveform on transmission parameters 202 for shared spectrum system 100, as depicted in FIG. 1. In the example illustration shown in FIG. 2, duty cycle 200 may include two OFF/ON LTE sub-cycles, but for simplicity of explanation, only the first LTE sub-cycle of duty cycle 200 is numbered and described. Transmission parameters 202 may include, without limitation, schedule traffic, noise levels, bit and/or packet errors, latency, and Wi-Fi throughput. The schedule traffic may, for example, be considered as without per packet contention mitigation, such as from an LTE-U transmission signal (e.g., aggressive transmission signal 114, FIG. 1).

In the exemplary embodiment, duty cycle 200 is first described with respect to the LTE OFF state of the cycle. In the LTE OFF state of a non-cooperative device (e.g., user equipment 102, FIG. 1), a transceiver of a cooperative device (e.g., Wi-Fi device 104, FIG. 1) is configured to monitor schedule traffic 204, noise levels 206, bit/packet errors 208, latency 210, and Wi-Fi throughput 212. In the LTE ON state of the non-cooperative device, however, the transceiver of the cooperative device detects an increase A in schedule traffic 204', an increase B in noise levels 206', an increase C in bit/packet errors 208', an increase D in latency 210', and a decrease E in Wi-Fi throughput 212'. Such negative effects on transmission parameters 202 from the presence of a non-cooperative transmission signal during the LTE ON state contribute to the experienced interference (e.g., interference 116, FIG. 1) of the cooperative Wi-Fi transmission (e.g., Wi-Fi transmission 112, FIG. 1).

Referring to both FIGS. 1 and 2, Wi-Fi device 104 is advantageously configured to implement one or more of the adaptation techniques, described above, to mitigate the deleterious effects on transmission parameters 202 experienced during the LTE ON state of duty cycle 200. For each of the following adaptation techniques, Wi-Fi device 104 is configured to listen to the shared spectrum of system 100 and detect aggressive transmission signal 114. Wi-Fi device 104 is further configured to utilize the information gathered through this detection process and assess the current state of Wi-Fi device 104, Wi-Fi transmission 112, and system 100, and calculate a likelihood that the performance of Wi-Fi transmission 112 will be negatively impacted. In an exemplary embodiment, the performance likelihood can be calculated utilizing gathered information regarding, without limitation, throughput, latency, packet loss, and other factors.

Utilizing the "do nothing" adaptation technique, when Wi-Fi device 104 calculates that performance loss is unlikely, that is, by consideration of the detected behavior of user equipment 102 and/or predetermined requirements of Wi-Fi device 104 at a particular time, Wi-Fi device 104 may maintain the polite legacy protocol without further adaptation. For this adaptation technique, Wi-Fi device 104 responds to the detection and identification of aggressive transmission signal 114 by making no additional change to the operation of Wi-Fi device 104 and Wi-Fi transmission 112. According to the "do nothing" adaptation technique, Wi-Fi device 104 does not adapt its own behavior, and instead remains in its legacy distributed access protocol state.

Utilizing the avoidance adaptation technique, when Wi-Fi device 104 calculates that performance will be negatively impacted by the presence of aggressive transmission signal 114, Wi-Fi device 104 is additionally configured to change, or switch, its transmission channel in order to avoid the frequency domain of aggressive transmission signal 114. For this adaptation technique, Wi-Fi device 104 is further configured to monitor system 100 and utilize information regarding conditions of alternative available channels. According to an exemplary embodiment, the conditions of such alternative channels are assessed by Wi-Fi device 104 using the listening functionality and detection processes described above.

The scheduling adaptation technique may be implemented when Wi-Fi device 104 calculates that performance will be negatively impacted by the presence of aggressive transmission signal 114. For this adaptation technique, Wi-Fi device 104 is additionally configured to utilize predictive information gathered in the detection process to avoid, or increase the likelihood of an avoidance with, aggressive transmission signal 114 and the time domain. In an exemplary embodiment, Wi-Fi device 104 monitors aggressive transmission signal 114 to additionally calculate duty cycle 200, and thereby schedule Wi-Fi transmission 112 to synchronize its cooperative contention window to correspond to the LTE OFF state of aggressive transmission signal 114. In one embodiment, the scheduling adaptation technique is implemented in place of, or to augment, the legacy distributed access protocol of Wi-Fi device 104. In an alternative or supplemental embodiment, the scheduling adaptation technique is further configured to adjust transmission lengths of the contention window in order to optimize for the length of the calculated LTE OFF state. The scheduling adaptation technique is further described below with respect to FIGS. 3 and 4.

The power adjustment adaptation technique may be implemented when Wi-Fi device 104 calculates that performance will be negatively impacted by the presence of aggressive transmission signal 114. For this adaptation technique, Wi-Fi device 104 is additionally configured to utilize predictive information gathered in the detection process, and increase the transmission power of Wi-Fi transmission 112 in order to maintain signal quality. In some embodiments, the presence of aggressive transmission signal 114 creates interference 116 through the increased noise level 206', which effectively "drowns out" Wi-Fi transmission 112. In an exemplary embodiment, Wi-Fi device 104 overcomes the "drowning out" effect by increasing the transmission power of Wi-Fi transmission 112 to maintain a sufficient signal-to-noise ratio to metaphorically "speak louder" than aggressive transmission signal 114 over the shared spectrum of system 100. This power adjustment adaptation technique is bound by certain limitations imposed by governing regulatory restrictions. In practice, most cooperative protocol transmissions operate sufficiently below the maximum levels imposed by regulatory restrictions, such that this adaptation technique is often available for use.

The throughput adjustment adaptation technique may be implemented when Wi-Fi device 104 calculates that performance will be negatively impacted by the presence of aggressive transmission signal 114. For this adaptation technique, Wi-Fi device 104 is additionally configured to reduce throughput of Wi-Fi transmission 112 in order to maintain reliability and performance of Wi-Fi transmission 112 in consideration of particular transmission parameters 202 such as latency 210, packet loss or errors 208, and/or consistency of Wi-Fi throughput 212. In some embodiments, cooperative technology systems include capability to adapt their own throughput according to a range of factors unrelated to the presence of non-cooperative technology. According to an exemplary embodiment of this throughput adjustment adaptation technique, Wi-Fi device 104 configured to utilize the detection process described above, and further adjust the throughput according to the detected and identified presence of aggressive transmission signal 114.

The reliability restoration adaptation technique may be implemented when Wi-Fi device 104 calculates that performance will be negatively impacted by the presence of aggressive transmission signal 114. For this adaptation technique, Wi-Fi device 104 is additionally configured to transmit Wi-Fi transmission 112 as multiple, separate transmissions in order to overcome errors (e.g. bit/packet errors 208) that may be more likely to occur from a single instance of Wi-Fi transmission 112. By transmitting multiple instances of Wi-Fi transmission 112, Wi-Fi device 104 is able to restore the transmission errors and losses that may arise in a single instance of Wi-Fi transmission 112 due to the presence of aggressive transmission signal 114.

As described above, each of the foregoing adaptation techniques may be implemented alone, or in combination with one or more of the other techniques, based on the calculated likelihood of negative performance impact from the presence of aggressive transmission signal 114 within system 100. The calculation may be based on the detected effect of aggressive transmission signal 114 itself, or may further consider other factors such as the relative strength of Wi-Fi transmission 112, other capabilities of Wi-Fi device 104, and/or operational considerations of system 100.

Figure 3:
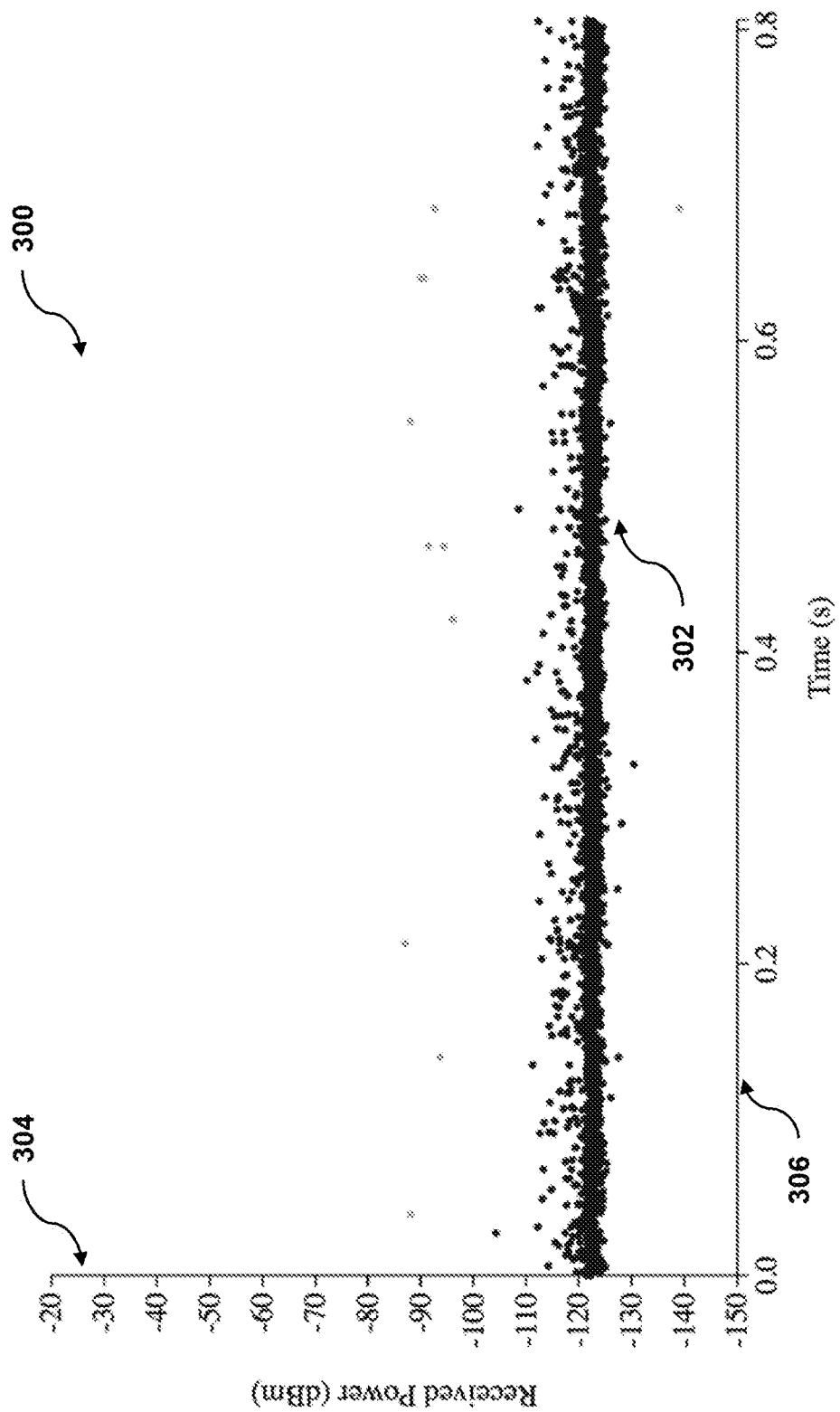
FIG. 3 is a graphical representation of a cooperative technology signal, according to an embodiment.

FIG. 3 is a graphical representation 300 of a cooperative technology signal 302, according to an embodiment. In this example, cooperative technology signal 302 may be a Wi-Fi transmission (e.g., Wi-Fi transmission 112, FIG. 1), and is represented as a function of received power 304 (y-axis), in units of decibel-milliwatts (dBm), over time 306 (x-axis), in units of seconds (s). In this example, cooperative technology signal 302, without the presence of a non-cooperative technology signal, can be seen to represent Wi-Fi energy generally clustered around the −120 dBm range. Cooperative technology signal 302 may, for example, represent the output of a signal generator (not shown). In some embodiments, the value of received power 304 is not confined purely to a received signal strength indicator (RSSI), and may alternatively include a combination of the RSSI, the noise floor, and/or a smoothing factor.

Figure 4:
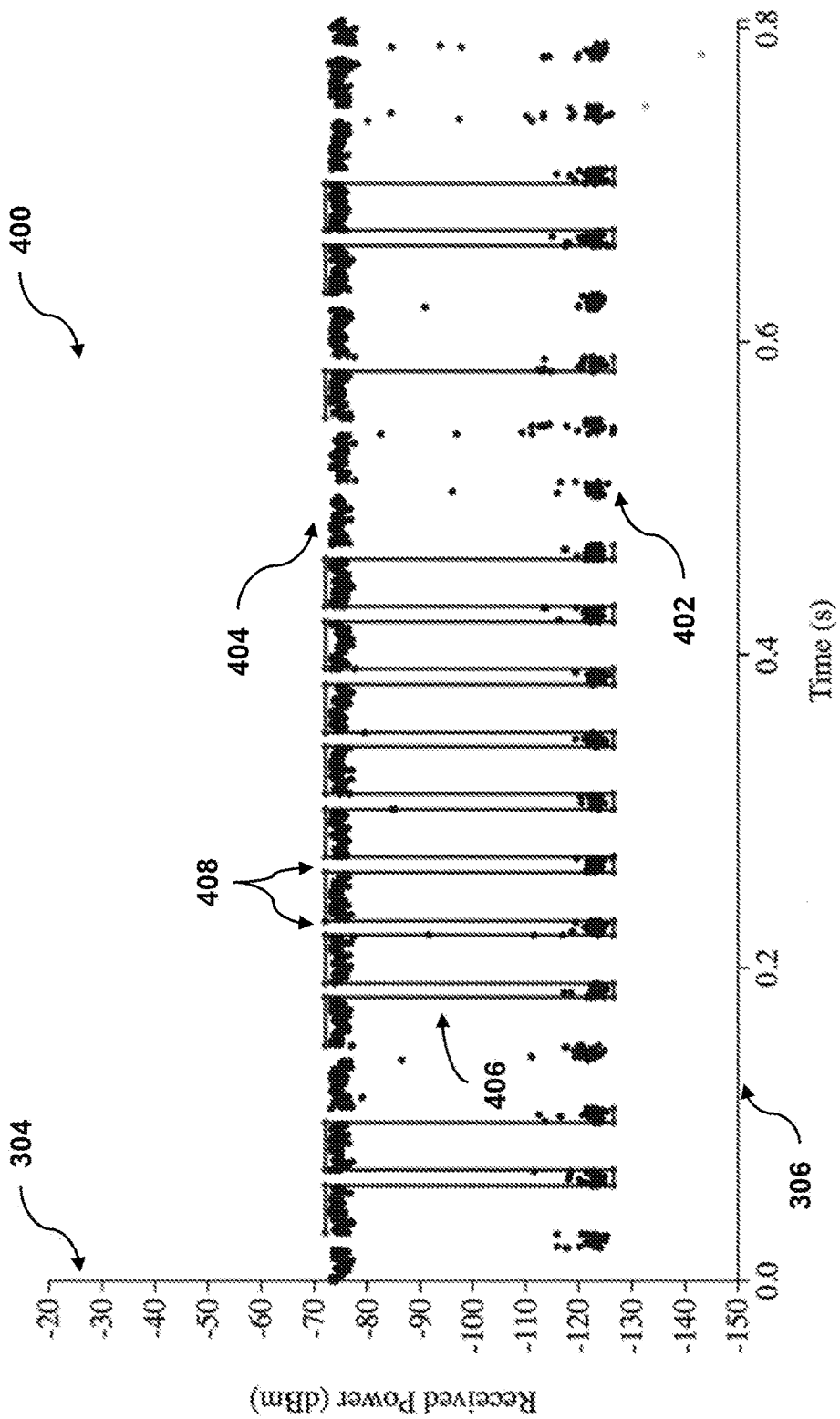
FIG. 4 is a graphical representation illustrating the scheduling of the cooperative technology signal depicted in FIG. 3, in the presence of the non-cooperative technology signal depicted in FIG. 1.

FIG. 4 is a graphical representation 400 illustrating a scheduling of a cooperative technology signal 402 in the presence of a non-cooperative technology signal 404. In this example, cooperative technology signal 402 may be similar to cooperative technology signal 302 (FIG. 3), except that cooperative technology signal 402 is adjusted to be limited, according to the scheduling adaptation technique, described above, such that cooperative technology signal 402 is synchronized to occur during the LTE OFF state of a duty cycle 406 of non-cooperative technology signal 404. In this example, non-cooperative technology signal 404 may be, for example, an aggressive transmission signal similar to aggressive transmission signal 114 (FIG. 1) for an LTE-U device (e.g., user equipment 102, FIG. 1). Duty cycle 406 may, for example the comparable to duty cycle 200 (FIG. 2).

With reference to the description above, in operation, graphical representation 400 illustrates initially how the Wi-Fi energy of cooperative technology signal 402 is still generally clustered around the −120 dBm range, but is still significantly impacted and negatively affected by the presence of non-cooperative technology signal 404 when the signal generator (not shown) of a corresponding device (e.g., user equipment 102, FIG. 1) is on (LTE ON state, FIG. 2). That is, since the signal generator is operating according to duty cycle 406, the transmission of non-cooperative technology signal is typically performed according to a regular time schedule. In other words, the LTE-U signal is transmitted only according to this scheduled duty cycle 406, and does not implement a polite LBT protocol or process prior to transmission within the shared spectrum.

According to an exemplary embodiment, the transceiver of a cooperative device (e.g., Wi-Fi device 104, FIG. 1) is configured to "listen" for and detect the energy levels of both technology signals 402, 404, and operate Wi-Fi device 104 to remain "silent" (that is, not transmit) upon "hearing" the presence of the interfering non-cooperative technology signal 404. However, Wi-Fi device 104 is further configured, according to the present embodiments, to additionally perform a dynamic analysis of gathered data and information, and then determine more than just the presence of noise from the interfering non-cooperative technology signal 404. Wi-Fi device 104 is further to perform a dynamic analysis gathered data and thus also calculate the duty cycle of non-cooperative technology signal 404 and any resultant noise therefrom.

Graphical representation 400 further illustrates how the LTE-U energy is generally clustered around the −75 dBm range, and also how duty cycle 406 can, after the calculation steps described above, be easily superimposed upon non-cooperative technology signal 404 within graphical representation 400. Such superimposition of duty cycle 406 further exposes gap windows 408, which appear between individual instances of clusters of non-cooperative technology signal 404 around the −75 dBm range, and for present timing portions within duty cycle 406 corresponding to the LTE OFF state.

The determination and calculation of gap windows 408 is therefore significant to at least the scheduling adaptive technique described above. As shown in FIG. 4, interference from non-cooperative technology signal 404 effectively disappears during the LTE OFF state, thereby rendering the timeslots available within gap windows 408 available for scheduling of cooperative technology signal 402, where the cooperative technology will not experience the deleterious effects of the aggressive transmission from non-cooperative technology signal 404. In other words, the contention window that is commonly utilized by cooperative transmission technologies can be synchronized or narrowed only occur during those times within gap windows 408. This scheduling adaptation technique may be further implemented utilizing different duty cycles, and also different power levels (which may, for example, function to simulate different distances from node 106 (FIG. 1).

The novel systems and methods described above thus realize significant advantages over conventional shared access systems by implementing the adaptive contention and mitigation techniques for shared access systems. Other advantages realized according the present systems and methods include, without limitation, (a) a CSMA/CA node (e.g., for Wi-Fi) that is configured to generally be able to alter its coexistence behaviors based upon the presence of other nodes and technologies within the shared spectrum, (b) a CSMA/CA configuration for distributed control that can still be applied in the presence of generally polite technologies, and (c) a CSMA/CA figuration for the mitigating control in the presence of an aggressive technology word node.

In one embodiment, when an aggressive node is detected, the polite CSMA/CA node (or transceiver) is configured to mitigate the effects of the interfering aggressive transmission signal by implementing one or more of the following responses thereto, including, without limitation: (1) Avoidance, where the cooperative node moves/switches the cooperative transmission away from the channel under aggressive traffic transmission conditions; (2) "Leveling the Playing Field," where the cooperative node adapts more aggressive techniques (e.g., power, throughput, etc.) in the presence of other aggressive technologies so that all nodes have an equivalent probability of sending traffic; and (3) Reliability Restoration, in order to mitigate the impact of packet collisions due to aggressive technologies to restore reliability. In the exemplary embodiment, for each of these responses, the polite, cooperative node (e.g., Wi-Fi device 104) continuously monitors the channel of the shared spectrum, and is additionally configured to adapt its coexistence contention transmission models/windows accordingly.

Referring to FIGS. 1-2 and 4, an adaptive contention model for shared access can be further applied with a Wi-Fi device (e.g., Wi-Fi device 104, FIG. 1), which contends with an LTE-U device (e.g., user equipment and 102, FIG. 1) in the same shared spectrum. The adaptive contention model implements one or more processes and subprocesses for the contention relating to, without limitation, monitoring, detection, determination, calculation, reporting, mitigation, and adaptation.

In such instances, system 100 may be configured to implement (through programming of a processor or similar device (not shown) of the various elements, or by computer readable instructions from the computer medium program) instructions to activate or respond to the following events, which to not have to occur in order except where indicated: (1) legacy operation of a Wi-Fi node; (2) transmission by an LTE-U device; (3) detection of the LTE-U transmission by the Wi-Fi node; (4) determination of spectrum consumed by the LTE-U device; (5) calculation of the LTE-U transmission timing; and (6) reporting of the LTE-U presence by the Wi-Fi node.

More specifically, in the legacy operation process, a cooperative Wi-Fi node (e.g., Wi-Fi device 104 or access point 108) operates in the legacy state (also referred to as the reference, or present, state), where the cooperative Wi-Fi node actively transmits a cooperative transmission signal in the presence of other, different, polite Wi-Fi nodes and technologies, utilizing distributed access control of the shared spectrum channel within system 100. During the LTE-U transmission process, the LTE-U device (e.g., user equipment 102), begins transmission within the shared spectrum band of system 100. In the LTE-U detection process, the Wi-Fi node detects the presence of the LTE-U (e.g., by monitoring the shared spectrum and measuring a signal strength of aggressive transmission signal 114. In the determination process, the Wi-Fi node utilizes its listening and analytic capabilities to determine what percentage of the shared spectrum is consumed by the LTE-U device/aggressive transmission signal. In the calculation process, the Wi-Fi node utilizes gathered information to calculate the transmission timing (e.g., duty cycle 200 or 406) of the non-cooperative LTE-U transmission signal. In the reporting process, the Wi-Fi node reports (e.g., through an alert system, not shown) the presence of the LTE-U/aggressive transmission signal to a user of Wi-Fi device 104 and/or to an owner of access point 108, a central server, or a database affiliated with the Wi-Fi technology.

In the exemplary embodiment, after completing the determination process, Wi-Fi device 104 further implements one or more mitigation strategies/techniques, as described above, to compensate for the presence of aggressive transmission signal 114, including, for example, an avoidance process and/or an adaptation process. In the avoidance process, the Wi-Fi node selects a band or channel that does not contain the non-cooperative LTE-U transmission signal. In some embodiments, the avoidance process further monitors for selected bands/channels that are not considered to be already too congested. In an exemplary embodiment of the adaptation process, the Wi-Fi node alters its own transmission properties when LTE-U is transmitting in order to realize an equal, or improved, opportunity to transmit. One example of this adaptation technique is described above with respect to FIG. 4.

According to the embodiment illustrated in FIG. 4, the present systems and methods are advantageously capable of executing a model for mitigation through adaptive contention by configuring the Wi-Fi node to alter its transmission contention behavior during LTE ON states/periods to gain an equal or improved opportunity for channel transmission. In the exemplary embodiment, this particular technique is applied when LTE-U is transmitting, that is, LTE ON. The Wi-Fi node can be further configured to revert to legacy behavior during the LTE OFF states/periods. According to this example, the Wi-Fi device is rendered able to effectively transmit data packets with ON/OFF duty cycles similar to the LTE-U device. That is, the WI-Fi device may determine the LTE-U duty cycle (e.g., 200, 406), and then adjust its packet transmissions for the same, or a similar, duty cycle to increase the probability of collision-free transmissions. According to this advantageous scheduling technique, the Wi-Fi device is able to greatly reduce clear channel assessment (CCA) and collision back off times, even to near-zero values.

In some embodiments, this scheduling process may utilize gathered information to predict both the LTE ON and LTE OFF state transmissions, and thereby schedule a brief Wi-Fi transmission frame (e.g., the contention window) immediately after the LTE-U transmission switches from LTE ON to LTE OFF. In this example, a processor of the Wi-Fi device determines the LTE-U duty cycle, adjusts its packet transmissions accordingly during the predicted LTE OFF state, and thus CCA and collision back off procedures are updated such that the procedures are executed only when the duty cycle of the LTE-U transmission is off and the chance of collision with other WI-FI networks increases. According to this advantageous process, Wi-Fi devices and access points capable of synchronizing Wi-Fi transmissions with LTE-U transmissions, and intentionally schedule Wi-Fi (cooperative signal) traffic when the duty cycle of the LTE-U transmission is off (LTE OFF).

As described above, a Wi-Fi device according to the embodiments disclosed herein is further advantageously capable of performing additional, and/or alternative adaptation mitigation actions, processes, and techniques when detecting a non-cooperative transmission in an LTE ON state. For example, the Wi-Fi device can be further configured to transmit at a lower modulation and coding scheme (MCS) to overcome encountered bit errors in the Wi-Fi transmission. In this example, the Wi-Fi device shifts or switches to a lower MCS to overcome the bit errors that occur due to LTE-U collisions. The lower MCS produces a lower, but more reliable, Wi-Fi throughput in the face of increased LTE-U collisions.

In another example, the Wi-Fi device is further configured to transmit redundant data packets to overcome packets lost due to transmission interference caused by the presence of an aggressive transmission signal. The transmission of redundant data packets serves to improve transmission reliability in the face of increases in LTE-U transmissions. The redundant data packets may, for example, be transmitted from the access point to the Wi-Fi device, or from the Wi-Fi device to the access point according to this embodiment.

In another example, the Wi-Fi device is further configured to reduce medium access control (MAC) layer frame sizes to increase successful reception of the transmitted Wi-Fi signal. By calculating the time when the periodic LTE-U transmissions are off (LTE OFF), the Wi-Fi device is capable of further adjusting the Wi-Fi MAC frame size to optimally occur within the period of the LTE OFF state, and thereby increase the probability of collision-free Wi-Fi transmissions. In an additional example, the Wi-Fi device is further configured to apply LTE-U interference cancellation at Wi-Fi receiver portions by subtracting the predicted LTE-U energy profile from the received Wi-Fi transmissions. Each and all of these exemplary mitigation techniques may be further configured to adjust the particular mitigation strategy in consideration of the Wi-Fi throughput.

According to the advantageous systems and methods disclosed herein, a Wi-Fi device, node, or transceiver is capable of realizing adaptation techniques for shared channel access models and mechanisms based upon the detection of aggressive technologies on the channel. The present systems and methods are further capable of dynamically moving a Wi-Fi transmission from one shared channel access model to another and back again based upon the cooperative and non-cooperative technologies detected and identified on the channel of the shared spectrum.

According to the disclosed embodiments, the Wi-Fi device may detect the presence of scheduled, that is, non-cooperative, technologies on the shared spectrum channel, and then identify LTE-U signatures in terms of one or more of (i) periodically variable received noise strength as function of time, (ii) shifts in latency impact to Wi-Fi transmissions as a function of time, (iii) periodic shifts in bit or packet error rates as a function of time, and (iv) periodic shifts in Wi-Fi throughput. Once the LTE-U transmission is detected and identified, a Wi-Fi device according to the disclosed embodiments is further advantageously capable of predicting future LTE-U transmissions based upon detected periodic disturbance(s) of the Wi-Fi performance parameters or indicators. Reliability of the detection may be improved by consideration of more than one of the parameters/indicators together. Once the determination and prediction processes are accurately completed, the Wi-Fi device according to the disclosed embodiments is able to implement one or more of the advantageous mitigation techniques and processes described above, whether simultaneously or in succession.

Exemplary embodiments of shared access communication management systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for managing shared wireless communications in a wireless communication network including at least one cooperative device and at least one non-cooperative device, the method comprising the steps of:
    monitoring, by the at least one cooperative device, a selected channel of a shared spectrum of the wireless communication network to gather energy level data of signals operating in the selected channel as a plurality of discrete data points each representing a measured power level at a respective point in time;
    dynamically analyzing, by the at least one cooperative device, the plurality of discrete data points,
    detecting, from the dynamically analyzed discrete data points, a first cluster of energy level data at a first non-zero power level, and a second cluster of energy level data at a second non-zero power level different from the first power level,
    extrapolating, from a pattern of the first cluster and the second cluster, a duty cycle of an aggressive transmission,
    determining, by the at least one cooperative device and based on the extrapolated duty cycle, an operation of the non-cooperative device within a measurable vicinity of the cooperative device;
    predicting, from the extrapolated duty cycle, a future on state and a future off state of the non-cooperative device; and
    controlling the at least one cooperative device based on the determined operation of the non-cooperative device.

2. The method of claim 1, wherein the at least one cooperative device utilizes a distributed access protocol relating to one or more of Wi-Fi, Bluetooth, and Zigbee technologies.

3. The method of claim 1, wherein the at least one non-cooperative device utilizes one or more of a long term evolution protocol and an unlicensed long term evolution protocol.

4. The method of claim 1, wherein the step of monitoring comprises a substep of employing carrier sense multiple access with collision avoidance.

5. The method of claim 1, wherein the step of determining determines that the operation of the non-cooperative device is the aggressive transmission.

6. The method of claim 5, wherein the step of controlling comprises one or more substeps of (i) reporting the presence of the aggressive transmission, (ii) calculating operational parameters of the aggressive transmission, and (iii) adapting a polite transmission of the at least one cooperative device based on the extrapolated duty cycle of the aggressive transmission.

7. The method of claim 6, wherein the step of controlling comprises the substep of adapting, and wherein the substep of adapting comprises one or more additional substeps of (i) maintaining a legacy protocol of the polite transmission, (ii) avoiding a frequency domain of the aggressive transmission, (iii) scheduling the polite transmission to transmit within periods when the duty cycle of the aggressive transmission is predicted to be in the off state, (iv) increasing an output power of the polite transmission, (v) adjusting a throughput of the polite transmission, and (vi) transmitting redundant data relating to the polite transmission.

8. The method of claim 7, wherein the substep of adapting comprises the additional substep of maintaining, and wherein the substep of maintaining comprises calculating that a performance loss of the polite transmission, in the presence of the aggressive transmission, is unlikely.

9. The method of claim 7, wherein the substep of adapting comprises the additional substep of scheduling, and wherein the substep of scheduling comprises calculating the duty cycle of the aggressive transmission from the operational parameters.

10. The method of claim 9, wherein the substep of scheduling comprises the further substep of synchronizing a contention window of the polite transmission to conform with the off state of the duty cycle of the aggressive transmission.

11. The method of claim 7, wherein the substep of avoiding comprises the further substep of switching a transmission channel of the polite transmission to a different transmission channel that does not contain the aggressive transmission.

12. The method of claim 7, wherein the substep of increasing the output power comprises the further substep generating a sufficient signal to noise ratio for the polite transmission to overcome an increased noise level in the selected channel resulting from the presence of the aggressive transmission.

13. The method of claim 7, wherein the substep of adjusting the throughput comprises the further substep reducing the transmission speed of the polite transmission.

14. The method of claim 1, wherein the first power level is substantially clustered around the −75 dBm range and the second power level is substantially clustered around the −120 dBm range.

15. A wireless communications system, comprising:
at least one cooperative electronic device including a processor and a transceiver, and configured to operate according to a wireless protocol within the operational vicinity of a non-cooperative electronic device capable of wirelessly sending and receiving aggressive transmission data to and from a communications node,
wherein the transceiver is configured to:
wirelessly send and receive polite transmission data to and from a nearby access point;
monitor energy levels of a frequency spectrum of a selected channel of a shared spectrum of the wireless communications system;
dynamically analyze power level data of the monitored energy levels;
extrapolate a pattern of clustered power level data from the dynamically analyzed power level data;
predict a duty cycle from the extrapolated pattern; and
identify the presence of the aggressive transmission data within a proximity of the at least one cooperative electronic device the predicted duty cycle.

16. The system of claim 15, wherein the at least one cooperative device comprises a Wi-Fi device.

17. The system of claim 15, wherein the at least one non-cooperative device comprises an unlicensed long term evolution user equipment.

18. The system of claim 15, wherein the communications node comprises evolved Node B hardware.

19. The system of claim 15, wherein the processor is configured to cause the transceiver to respond to the identified presence of the predicted duty cycle.

20. The system of claim 19, wherein the transceiver is further configured to initiate a response comprising one or more of (i) reporting the identified presence of the aggressive transmission data, (ii) calculating additional operational parameters of the aggressive transmission data, and (iii) adapting the polite transmission data based on the predicted duty cycle.

\* \* \* \* \*